(12) United States Patent
Marum et al.

(10) Patent No.: US 7,274,545 B2
(45) Date of Patent: Sep. 25, 2007

(54) ESD CLAMP WITH "TRAILING PULSE" SUPPRESSION

(75) Inventors: Steven Edward Marum, Sherman, TX (US); Dening Wang, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 153 days.

(21) Appl. No.: 11/131,105

(22) Filed: May 17, 2005

(65) Prior Publication Data

US 2006/0262470 A1 Nov. 23, 2006

(51) Int. Cl.
*H02H 3/00* (2006.01)
(52) U.S. Cl. ....................................................... 361/56
(58) Field of Classification Search .................. 361/56
See application file for complete search history.

(56) References Cited

U.S. PATENT DOCUMENTS 5,903,220 A * 5/1999 Jon et al. .................... 340/600
5,946,177 A * 8/1999 Miller et al. ................... 361/56

OTHER PUBLICATIONS

C. Duvvury, R. Steinhoff, G. Boselli, V. Reddy, H. Kunz, S. Marum, R. Cline, "Gate Oxide Failures Due to Anomalous Stress from HBM ESD Testers", EOS/ESD 2004, p. 132-140, no month.

* cited by examiner

*Primary Examiner*—Ronald W. Leja
(74) *Attorney, Agent, or Firm*—William B. Kempler; W. James Brady, III; Frederick J. Telecky, Jr.

(57) ABSTRACT

In a method and system for protecting a semiconductor device from an electrostatic discharge (ESD) event, an ESD tester generates an ESD event by providing an ESD test signal having a leading pulse and a trailing pulse. An ESD input of the device under test (DUT) receives the ESD test signal. An ESD protection circuit embedded in the DUT detects the ESD signal and asserts a trigger in response to the detection. The ESD protection circuit provides a leading discharge path to the leading pulse in response to detecting the ESD signal, thereby protecting the DUT during the leading pulse. In addition, the ESD protection circuit also provides a trailing discharge path to the trailing pulse in response to the trigger, thereby protecting the DUT during the trailing pulse.

17 Claims, 3 Drawing Sheets

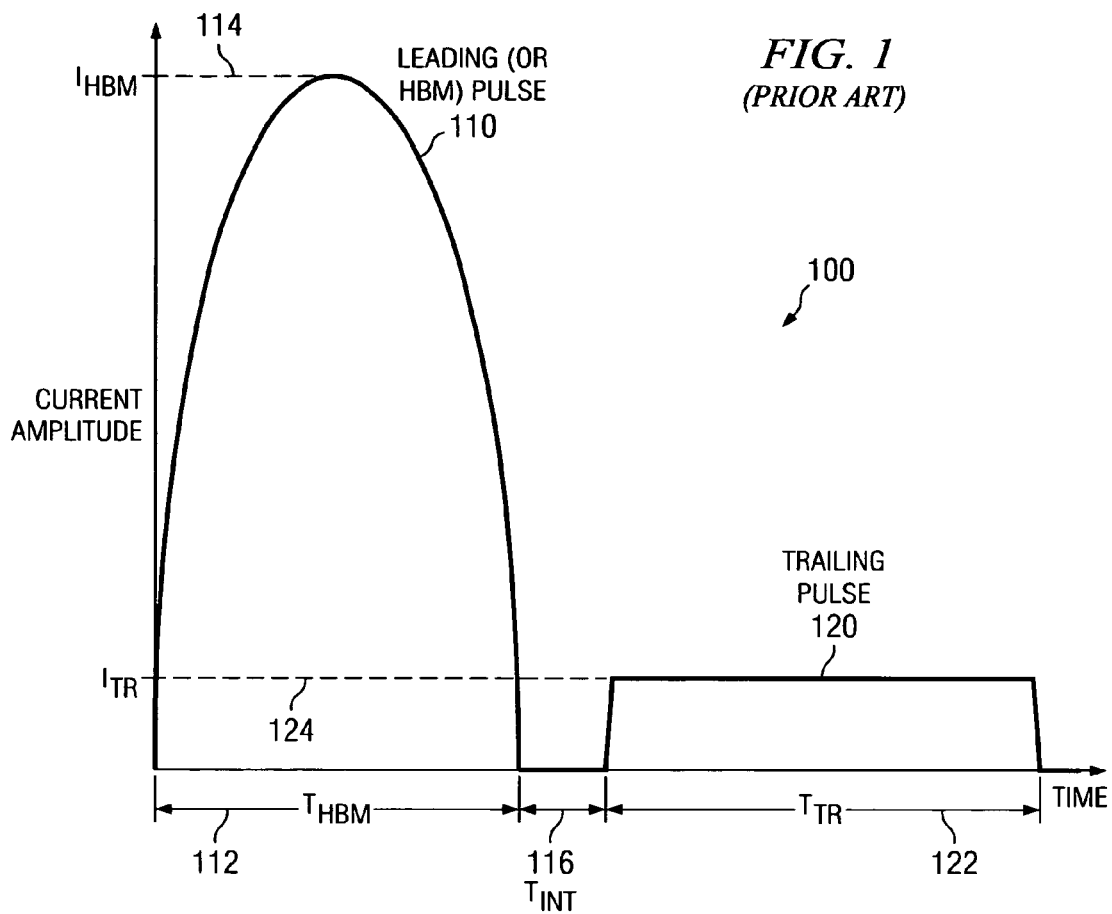
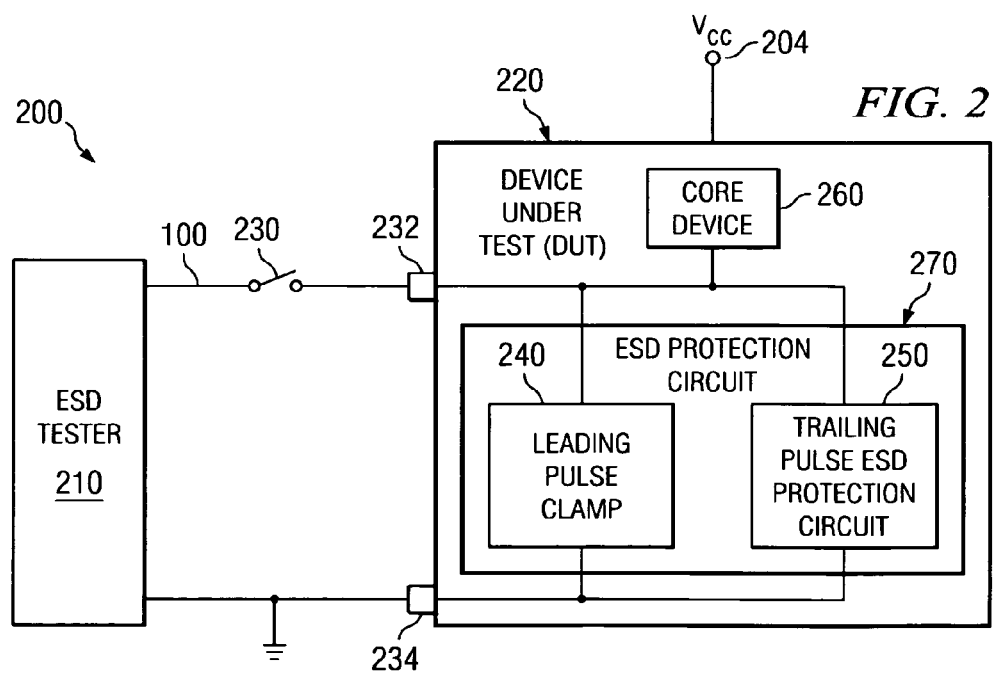

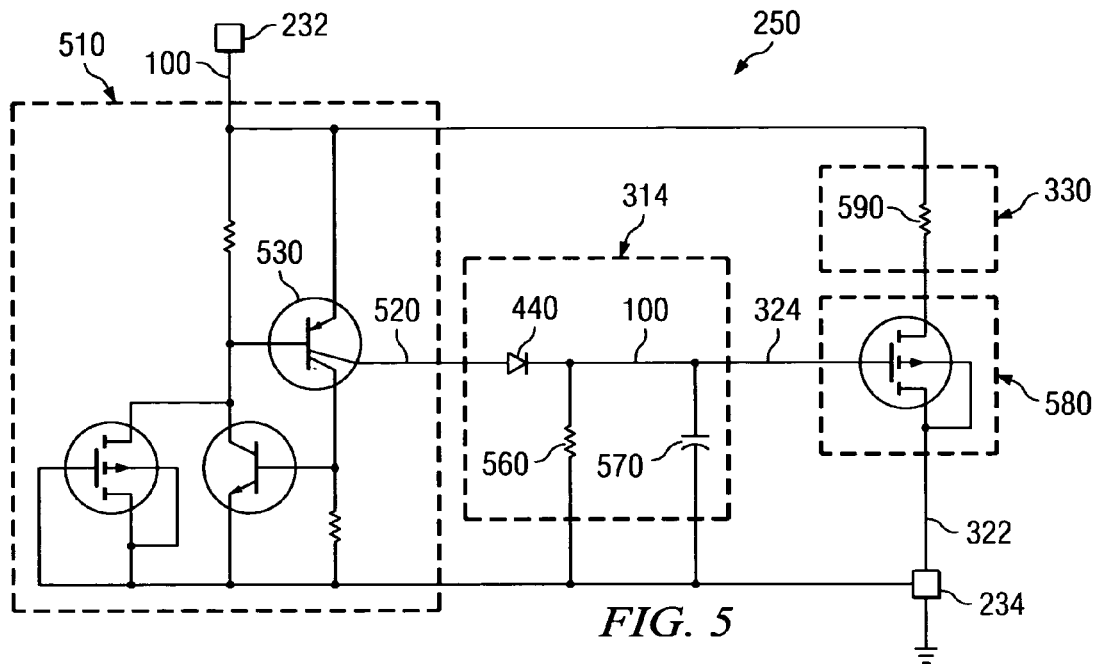
FIG. 5
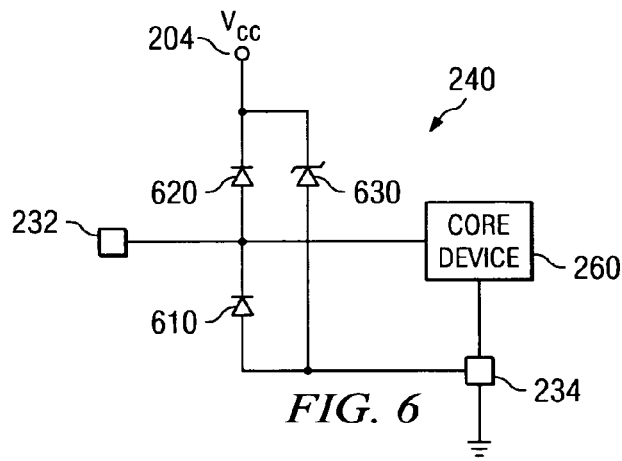
FIG. 6
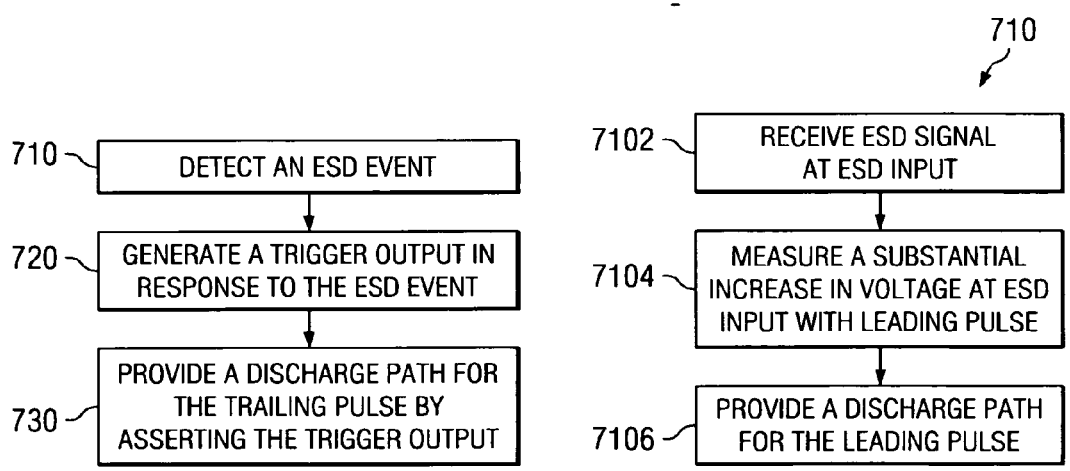
FIG. 7A
FIG. 7B

ESD CLAMP WITH "TRAILING PULSE" SUPPRESSION

BACKGROUND

The present disclosure relates generally to integrated circuits, and more particularly to a system and method for providing electrostatic discharge (ESD) protection.

Integrated circuits (ICs) may be damaged by ESD phenomena. An IC device may be exposed to ESD generated from many sources such as a human body. Everyday activity such as walking across a floor may cause an accumulation of an electrostatic charge on the body. Simple contact of a fingertip to an IC device allows the body to discharge, possibly causing damage to the IC device. A widely used model used to simulate this event is the Human Body Model (HBM). Obviously, insufficient or improper ESD protection may result in lowering the reliability of the IC and/or may cause permanent damage to the device.

Manufacturers of electrical/electronic devices such as ICs, digital signal processors, radio frequency (RF) circuit devices, printed circuit boards, and other circuits, typically use automatic test equipment (ATE) or similar other test systems to test the devices during the production process, preferably before they are installed by a user. The test systems including an ESD tester are generally configured to apply a test signal to a device under test (DUT) and measure the response.

A technical paper entitled 'Gate Oxide Failures Due to Anomalous Stress from HBM ESD Testers', authored by C. Duwury, R. Steinhoff, G. Boselli, V. Reddy, H. Kunz, S. Marum, R. Cline, all of Texas Instruments, Inc., and presented at the Proceedings of EOS/ESD Symposium, pages 132-140, 2004, which is incorporated herein by reference, describes anomalous stress effects from many commercially available HBM ESD testers.

FIG. 1 illustrates a waveform of a typical ESD test signal provided by an ESD tester, according to prior art. An ESD event may be described as a transfer of energy between two bodies having different electrostatic potentials. The transfer may occur through contact or via an ionized discharge such as a spark. The ESD event may be intentional or unintentional. During an ESD event such as performing an ESD stress test, a stress test signal 100 is applied to the DUT such as an IC. A leading pulse 110 (also referred to as a HBM pulse 110 in a HBM model context) represents the intended portion of the ESD stress signal 100. Amplitude $I_{HBM}$ 114 of the HBM pulse 110 may be several amperes, e.g., 1 to 10 amperes, and time duration $T_{HBM}$ 112 of the HBM pulse 110 may be approximately 500 nanoseconds (ns). A trailing pulse 120 represents the unintended and often undesirable portion of the ESD stress signal 100. Amplitude $I_{TR}$ 122 of the trailing pulse 120 may be tens of microamperes (μA), with a range up to 1 mA, and time duration $T_{TR}$ 122 of the trailing pulse 110 may be approximately 1 millisecond (ms). A time period $T_{INT}$ 116 between the HBM pulse 110 and the trailing pulse 120 is variable and may depend on the particular characteristics of the ESD tester.

Generally, to avoid damage to the IC during an ESD event, ESD protection devices, e.g., ESD clamps, are typically fabricated on the IC and connected to the IC input/output pads and input/output circuits and other internal nodes of the IC. ESD protection devices generally provide discharge paths so that the internal core circuits of the IC are protected during the ESD event. Damage to the IC device caused by the ESD event is generally determined by the device's ability to dissipate the energy of the discharge and/or withstand the current levels involved therein.

The amplitude of the leading pulse 110 is generally sufficient to trigger ESD clamps on the DUT, thereby protecting the DUT from damage. The amplitude of the trailing pulse 120 is generally low and insufficient to trigger the ESD clamps on the DUT. However, voltage of the IC pad receiving the ESD test signal increases to the breakdown voltage and remains there during the duration $T_{TR}$ 122 of the trailing pulse 120. The high voltage may inject carriers into gate oxide structures of input transistors of the IC causing a threshold shift and/or may cause gate oxide failures. This is undesirable and may cause the DUT to fail the ESD test.

Modifying an ESD tester to eliminate the trailing pulse 120 may be a potential solution. However, this modification may be costly and time consuming. Combined used of modified as well as legacy (unmodified) ESD testers may continue to show inconsistent results and may cause further confusion.

Therefore, a need exists to provide an improved method and system for providing ESD protection to semiconductor devices. Additionally, a need exists to provide an improved technique to cost effectively utilize existing or legacy test system for ESD testing of the DUT. Accordingly, it would be desirable to provide an improved ESD protection system for ICs, absent the disadvantages found in the prior methods discussed above.

SUMMARY

The foregoing need is addressed by the teachings of the present disclosure, which relates to an ESD clamp with "trailing pulse" suppression. According to one embodiment, in a method and system for protecting a semiconductor device from an electrostatic discharge (ESD) event, an ESD tester generates an ESD event by providing an ESD test signal having a leading pulse and a trailing pulse. An ESD input of the device under test (DUT) receives the ESD test signal. An ESD protection circuit embedded in the DUT detects the ESD signal and asserts a trigger in response to the detection. The ESD protection circuit provides a leading discharge path to the leading pulse in response to detecting the ESD signal, thereby protecting the DUT during the leading pulse. In addition, the ESD protection circuit also provides a trailing discharge path to the trailing pulse in response to the trigger, thereby protecting the DUT during the trailing pulse.

In a particular embodiment, an ESD protection system includes an ESD input to receive an ESD signal. The ESD signal, which may be generated by an ESD tester during an ESD test event, includes a leading pulse and a trailing pulse. An event detector is coupled to the ESD input to receive the ESD signal. The event detector detects the ESD signal and generates a trigger output signal in response to receiving the ESD input. A trailing pulse clamp is coupled to the ESD input to receive the ESD signal. A switch is coupled in series with the trailing pulse clamp. The operation of the switch is controlled by the trigger output signal. When the trigger output signal is asserted during the trailing pulse, the trailing pulse clamp and the switch provide a trailing discharge path for the trailing pulse.

Several advantages are achieved by the method and system according to the illustrative embodiments presented herein. The embodiments advantageously provide for an improved ESD protection technique to cost effectively suppress the damaging effects of the trailing pulse. Thus, the improved ESD protection technique advantageously protects gate oxide structures of input transistors of the DUT, thereby increasing the reliability of the DUT. In addition, costly and time consuming upgrades to eliminate the trailing pulse generated by many commercially available ESD testers, including legacy ESD testers, may be avoided and the results obtained by these testers may show more consistent results. This advantageously enables manufacturing facilities to continue to use existing ESD testers for testing semiconductor devices in a cost effective and timely manner.

BRIEF DESCRIPTION OF THE DRAWINGS

FIG. 1 described hereinabove, illustrates a waveform of a typical ESD test signal provided by an ESD tester, according to prior art;

FIG. 2 illustrates a block diagram of an improved test system for testing a device, according to an embodiment;

FIG. 5 is a circuit diagram illustrating another implementation of a trailing pulse ESD protection circuit of FIG. 3, according to an embodiment;

FIG. 6 is an illustrative circuit diagram to implement a leading pulse clamp of FIG. 2, according to an embodiment;

FIG. 7A is a flow chart illustrating a method of protecting a semiconductor device from an ESD event, according to an embodiment; and FIG. 7B is a flow chart illustrating a method of detecting an ESD event, according to an embodiment.

DETAILED DESCRIPTION

Figure 3:
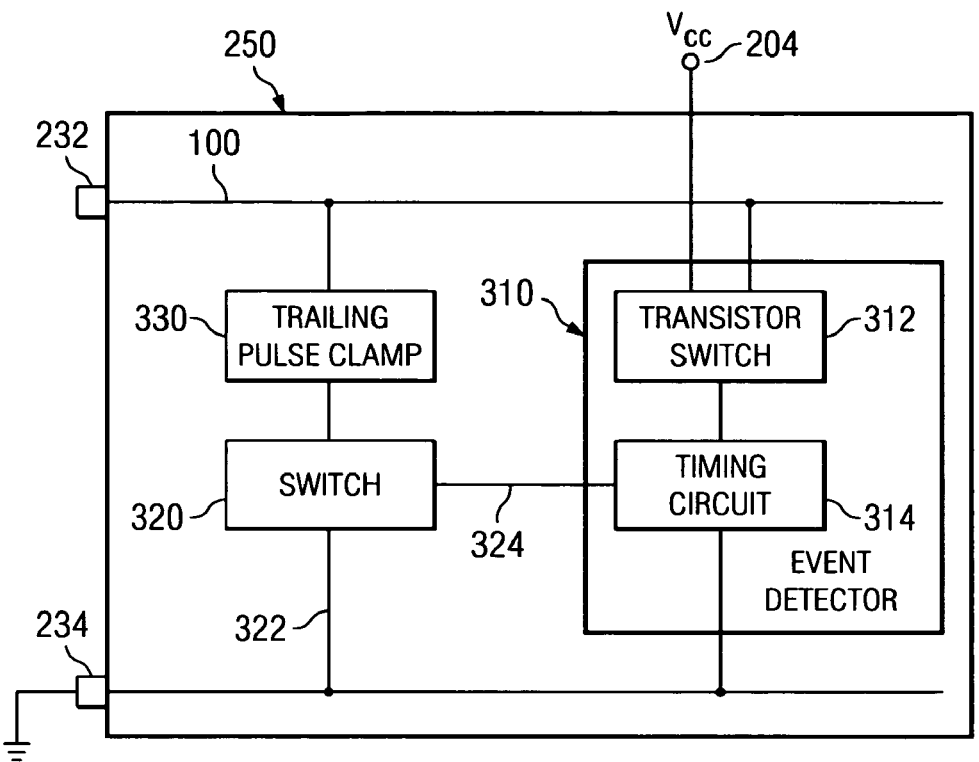
FIG. 3 is a block diagram illustrating details of a trailing pulse ESD protection circuit of FIG. 2, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Many commercially available HBM ESD testers generate the trailing pulse 120, which represents the unintended and often undesirable portion of the ESD stress signal 100. The trailing pulse 120 may cause unintended damage to the gate oxide structure of the input transistors of the DUT. This problem may be addressed by an improved ESD protection technique to suppress the damaging effects of the trailing pulse 120. In the improved system and method, the ESD signal is detected at an ESD input of the DUT. A discharge path for the trailing pulse 120 is enabled during the trailing pulse 120 in response to the detection.

According to one embodiment, in a method and system for providing ESD protection, an ESD tester generates an ESD event by providing an ESD test signal having a leading pulse and a trailing pulse. An ESD input of the device under test (DUT) receives the ESD test signal. An ESD protection circuit embedded in the DUT detects the ESD signal and asserts a trigger in response to the detection. The ESD protection circuit provides a leading discharge path to the leading pulse in response to detecting the ESD signal, thereby protecting the DUT during the leading pulse. In addition, the ESD protection circuit also provides a trailing discharge path to the trailing pulse in response to the trigger, thereby protecting the DUT during the trailing pulse.

FIG. 2 illustrates a block diagram of an improved test system 200 for testing a device 220, according to an embodiment. The test system 200 includes an ESD tester 210 operable to provide an ESD stress signal to the device under test (DUT) 220. The DUT 220 may be any semiconductor device such as an integrated circuit chip operable to perform at least one predefined function. In a particular embodiment, the ESD stress signal may have a leading pulse and a trailing pulse. In the depicted embodiment, the ESD stress signal provided by the ESD tester 210 is the ESD test signal 100. A switch 230 controls the flow of the ESD test signal 100. The DUT 220 includes an ESD input 232 to receive an input and an output 234 to provide an output. A voltage supply $V_{CC}$ 204 may be used as a reference by the DUT 220. The voltage supply $V_{CC}$ 204 may provide a plurality of voltages levels to the DUT 220. When the switch 230 is closed, the DUT 220 receives the ESD test signal 100 at the ESD input 232. Coupling the output 234 to the ESD tester 210 completes the return path for the ESD test signal 100. In a particular embodiment, the output 234 may be coupled to a ground rail.

As described earlier the ESD test signal 100 includes the leading pulse 110 and the trailing pulse 120. In the depicted embodiment, the DUT 220 includes an ESD protection circuit 270 having a leading pulse clamp 240 (also referred to as a HBM pulse clamp 240) for discharging the leading pulse, e.g., the HBM pulse 110 and a trailing pulse ESD protection circuit 250 for discharging the trailing pulse 120. The DUT 220 also includes a core circuit 260 for performing at least one predefined function. In an exemplary, non-depicted embodiment, the core circuit 260 may include one or more input transistors and one or more other active components such as IC's, digital signal processors, radio frequency (RF) devices, controllers and the like. The core circuit 260 is coupled to the ESD input 232. The ESD protection structure, e.g., the ESD protection circuit 270, protects the core circuit 260 during an ESD event, while the ESD protection structure does not substantially degrade the performance of the core circuit 260 during normal operation. Additional details of the trailing pulse ESD protection circuit 250 and the leading pulse clamp 240 are described in FIG. 3 and FIG. 6 respectively.

FIG. 3 is a block diagram illustrating details of a trailing pulse ESD protection circuit of FIG. 2, according to an embodiment. In the depicted embodiment, the trailing pulse ESD protection circuit 250 includes an event detector 310 coupled to the ESD input 232. The event detector 310 receives the ESD input 232, detects a substantial increase in a voltage of the received ESD input 232 due to the leading pulse 110, and generates a trigger output signal 324 in response to receiving the ESD input 232. The trigger output signal 324 is asserted to control, e.g., open or close, a switch 320. The switch 320 is coupled in series between a trailing pulse clamp 330 coupled to the ESD input 232 and the output 234 connected to the ground. Thus, when the switch 320 is closed a trailing discharge path 322 for the trailing pulse 120 is enabled. The trailing discharge path 322 includes the ESD input 232, the trailing pulse clamp 330, the switch 320 and the output 234 connected to the ground. The trailing discharge path 322 is enabled or disabled by controlling the switch 320. In a particular embodiment, the trailing discharge path 322 is enabled for the time duration $T_{TR}$ 122 of the trailing pulse 120 and the trailing discharge path 322 is disabled when the trailing pulse 120 is not present.

In the depicted embodiment, the event detector 310 includes a transistor switch 312 coupled to the ESD input 232 and a timing circuit 314 coupled in series between the transistor switch 312 and the output 234 connected to the ground. The transistor switch 312 may use $V_{CC}$ 204 as a reference. In a particular embodiment, the DUT 220 is not powered and $V_{CC}$ 204 is substantially equal to 0 volts. In this embodiment, the event detector 310, the trailing pulse clamp 330 and the switch 320 are powered by the ESD signal 100. During normal operation, with $V_{CC}$ 204 applied, input signals may not be greater than $V_{CC}$ 204 and the switch transistor 312 remain off during normal operation. The transistor switch 312 turns on during an ESD event, when the ESD input 232 goes above $V_{CC}$ 204 due to the leading pulse 110. Thus $V_{CC}$ 204 is used as a reference for detecting presence of an ESD event. The transistor switch 312 is closed when the ESD signal 100 is received at the ESD input 232 and the transistor switch 312 is open otherwise, e.g., when no ESD signal 100 is received. The timing circuit 314 receives a charge when the transistor switch 312 is closed. The charge stored in the timing circuit 314 is sufficient to assert the trigger output signal 324 for the time duration $T_{TR}$ 122 of the trailing pulse 120. That is, the timing circuit 314 enables the trailing discharge path 322 during the trailing pulse 120. At the end of the trailing pulse 120, the trigger output signal 324 is de-asserted and the switch 320 is open, thereby opening the trailing discharge path 322.

In a particular embodiment, the trailing pulse clamp 330 provides protection to the core circuit 260 and hence to the DUT 220 during time period $T_{TR}$ 122 of the trailing pulse 120 by maintaining the voltage at the ESD input 232 below the breakdown voltage of the input transistors of the core circuit 260. Additional details of the trailing pulse clamp 330 are provided in FIG. 4.

Figure 4:
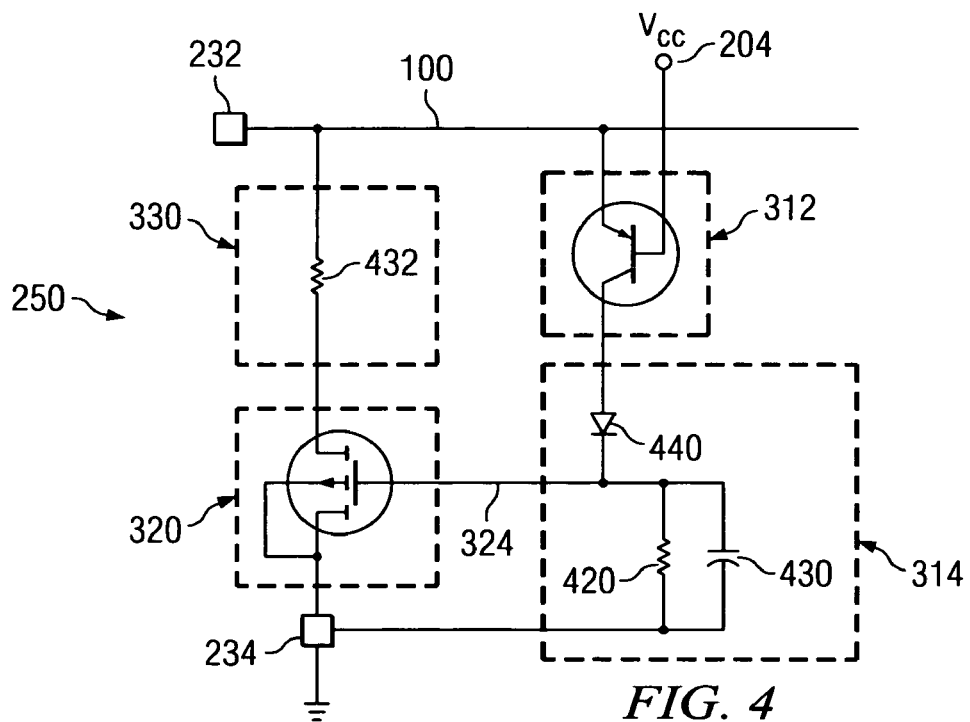
FIG. 4 is an illustrative circuit diagram to implement a trailing pulse ESD protection circuit of FIG. 3, according to an embodiment.

FIG. 4 is an illustrative circuit diagram to implement a trailing pulse ESD protection circuit of FIG. 3, according to an embodiment. In the depicted embodiment, the trailing pulse clamp 330 includes a resistor 432. In the depicted embodiment, the resistor 432 is coupled in series between the ESD input 232 and the switch 320 coupled to output 234 and ground. In the depicted embodiment, the switch 320 is a MOSFET switch.

In a particular embodiment, the resistor 432 is approximately 10 kilo ohms (kΩ). The particular value of the resistor 432 selected may change depending of the characteristics of the ESD signal 100 and the ESD tester 210. In a particular embodiment, the value of the resistor 432 is selected so that a voltage at the ESD input 232 is below a threshold during the trailing pulse 120, the threshold being below a predefined breakdown voltage of an input transistor of the core circuit 260. The value of the predefined breakdown voltage and hence the threshold may depend on voltage characteristics of the input transistors included in the core circuit 260.

The transistor switch 312 is coupled to the ESD input 232. In the depicted embodiment, the transistor switch 312 includes a pnp transistor. As described earlier, the voltage level of $V_{CC}$ 204 may be used as a reference. The transistor switch 312 is closed when the leading pulse 110 is received at the ESD input 232 and the transistor switch 312 is open otherwise, e.g., when no leading pulse 110 is received. When the transistor switch 312 is closed a charge is provided to the timing circuit 314 that is coupled to ground. In the depicted embodiment, the timing circuit 314 is implemented as an RC circuit that includes resistor 420 coupled in parallel with capacitor 430. The charging of the RC circuit occurs through a diode 440 during the leading pulse 110. The trigger output signal 324 is asserted when sufficient charge is accumulated in the RC circuit to raise the gate voltage of the MOSFET above the threshold voltage and thereby close the switch 320. The particular values of resistor 420 and capacitor 430 are selected so that the switch 320 remains closed during period $T_{TR}$ 122 of the trailing pulse 120 and the switch 320 is opened after the trailing pulse 120.

FIG. 5 is a circuit diagram illustrating another implementation of a trailing pulse ESD protection circuit of FIG. 3, according to an embodiment. In a particular embodiment, a silicon controlled rectifier (SCR) clamp may be modified to implement the trailing pulse ESD protection circuit 250. In the depicted embodiment, a low voltage silicon controlled rectifier (LVTSCR) based clamp 510 is modified by adding another p-region (collector) 520 in a pnp transistor 530 and using the collector 520 to charge the timing circuit 314. In a particular embodiment, when the ESD signal 100 is detected at the ESD input 232, the collector 520 provides a charge to the timing circuit 314 via the diode 440. The timing circuit 314 includes the RC circuit. In a particular embodiment, the RC circuit includes a resistor 560 and a capacitor 570 coupled in parallel. In a particular embodiment, the trailing pulse clamp 330 includes a resistor 590. Resistor 590 coupled in series with a MOSFET switch 580 provides the trailing discharge path 322 when the MOSFET switch 580 is closed. For normal operation of the core circuit 260 the MOSFET switch 580 is open since the gate voltage of the MOSFET is below the threshold voltage. The RC circuit is charged sufficiently during the leading pulse 110 to assert the trigger output signal 324 during period $T_{TR}$ 122 of the trailing pulse 120. In a particular embodiment, resistor 560 is substantially the same as the resistor 420 and the capacitor 570 is substantially the same as the capacitor 430. In the depicted embodiment, the trailing pulse ESD protection circuit 250 is powered by the ESD signal 100.

Other implementations of the trailing pulse ESD protection circuit 250 based on alternative ESD clamp designs using zener diodes, transient voltage suppressor (TVS) diodes, MOSFET, metal oxide varistors, grounded-gate triggered NMOS/PMOS and the like are contemplated. These alternative implementations may utilize the timing circuit 314 that includes the RC circuit as a common element to provide a discharge path for the period $T_{TR}$ 122 of the trailing pulse 120.

FIG. 6 is an illustrative circuit diagram to implement a leading pulse clamp of FIG. 2, according to an embodiment. The leading pulse clamp 240 may use any known ESD clamp techniques. In the depicted embodiment, the leading pulse clamp 240 includes a diode 610 connected in series between the ESD input 232 and ground, and diode 620 connected in series between $V_{CC}$ 204 and the ESD input 232. A zener diode 630 coupled between $V_{CC}$ 204 and output 234/ground provides a discharge path for the leading pulse 110, thereby protecting the core circuit 260. Thus, the leading pulse clamp 240 may be used to clamp ESD pulses (both positive or negative) to the power or ground thereby maintaining current flow in the diode's forward direction.

Other implementations of the leading pulse clamp 240 based on known ESD clamp designs using transient voltage suppressor (TVS) diodes, MOSFET, metal oxide varistors, grounded-gate triggered NMOS/PMOS and the like are contemplated.

FIG. 7A is a flow chart illustrating a method of protecting a semiconductor device from an ESD event, according to an embodiment. At step 710, an ESD event detector such as the event detector 310 detects an ESD event. In a particular embodiment, an ESD tester may generate the ESD event. The ESD event includes generating an ESD test signal such as the ESD test signal 100 having the leading pulse 110 and the trailing pulse 120. At step 720, the event detector generates a trigger output such as the trigger output signal 324 in response to the detection of the ESD test signal 100. In a particular embodiment, the event detector may detect a presence of the ESD test signal 100 by detecting an increase in the voltage level at an ESD input pad that exceeds a predefined level within a predefined time interval. The particular values for the voltage increase and the predefined time interval may depend on the characteristics of the leading pulse 100. At step 730, the event detector provides a discharge path such as the trailing discharge path 322 for the trailing pulse 120 by asserting a trigger signal such as the trigger output signal 324 during the trailing pulse 120. That is, the energy stored in the trailing pulse 120 is discharged safely without damaging the core circuit 260.

Various steps described above may be added, omitted, combined, altered, or performed in different orders. For example, in a particular embodiment, detecting an ESD event at step 710 may include performing multiple steps as described in FIG. 7B.

FIG. 7B is a flow chart illustrating a method of detecting an ESD event, according to an embodiment. At step 7102, the ESD signal 100 is received at an ESD input of the DUT. At step 7104, a substantial increase in a voltage received at the ESD input is measured indicative of the leading pulse 110. In a particular embodiment, the substantial increase in voltage is an increase in the voltage level at an ESD input pad that exceeds a predefined level within a predefined time interval. At step 7106, a leading discharge path is provided for the leading pulse 110.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, while certain aspects of the present disclosure have been described in the context of the system 200 having one or more devices, those of ordinary skill in the art will appreciate that the processes disclosed are capable of being implemented using hardware, software, and firmware components including systems-on-a-chip (SoC). As another example, even though the system 200 has been described in the context of the HBM model, those of ordinary skill in the art will appreciate that the systems and processes disclosed herein are capable of being implemented for use in any ESD stress environment.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An electrostatic discharge (ESD) protection system comprising:
   an ESD input to receive an ESD signal having a leading pulse and a trailing pulse;
   a leading pulse clamp coupled to the ESD input, wherein the leading pulse clamp provides a leading discharge path for the leading pulse;
   an event detector for receiving the ESD signal and having a trigger output signal, wherein the event detector provides the trigger output signal in response to receiving the ESD signal;
   a trailing pulse clamp for receiving the ESD signal; and
   a switch coupled in series with the trailing pulse clamp, wherein the switch and the trailing pulse clamp provide a trailing discharge path for the trailing pulse, wherein the event detector, the trailing pulse clamp and the switch are powered by the ESD signal.

2. In the system of claim 1, wherein the trailing pulse has a predefined time interval, wherein the trailing pulse clamp receives the trailing pulse during the predefined time interval.

3. In the system of claim 2, wherein the switch disconnects the trailing pulse clamp from receiving the trailing pulse after the predefined time interval.

4. In the system of claim 1, wherein the switch remains closed during the trailing pulse by asserting the trigger output signal.

5. In the system of claim 1, wherein the event detector includes a transistor switch for receiving the ESD signal and a timing circuit coupled in series between the transistor switch and ground, wherein the transistor switch is enabled by the leading pulse, wherein the timing circuit provides the trigger output signal during the trailing pulse.

6. In the system of claim 1, wherein the trailing pulse clamp includes a resistor, wherein a value of the resistor is selected to reduce a voltage at the ESD input below a threshold during the trailing pulse, wherein the threshold is less than a predefined breakdown voltage for an input transistor included in a core circuit.

7. In the system of claim 6, wherein the value of the resistor is approximately 10 kilo ohms (kΩ).

8. In the system of claim 1, wherein the trailing pulse clamp protects a core circuit during the trailing pulse, wherein the core circuit includes at least one input transistor.

9. A method of protecting a semiconductor device from an electrostatic discharge (ESD) event, the method comprising:
   detecting an ESD signal having a leading pulse and a trailing pulse, wherein the ESD signal is generated by the ESD event wherein the detecting includes:
   receiving the ESD signal at an ESD input of the semiconductor device; measuring a substantial increase in a voltage received at the ESD input; and providing a leading discharge path for the leading pulse;
   asserting a trigger output signal in response to the detection of the ESD signal;
   and providing a trailing discharge path for the trailing pulse, wherein the trailing discharge path is provided during the trailing pulse by the assertion of the trigger output signal.

10. In the method of claim 9, wherein the leading discharge path and the trailing discharge path protect the semiconductor device during the leading pulse and during the trailing pulse.

11. In the method of claim 9, wherein providing the trailing discharge path includes:
   connecting a resistor between the ESD input and ground, wherein a connection to the ground is provided by the assertion of the trigger output signal during the trailing pulse.

12. In the method of claim 9, wherein the semiconductor device is an integrated circuit chip operable to perform at least one predefined function.

13. An electrostatic discharge (ESD) test system comprising:
   an ESD tester to provide an ESD test signal, wherein the ESD signal includes a leading pulse and a trailing pulse; and
   a device under test (DUT) having an ESD input to receive the ESD test signal, wherein the DUT includes a leading pulse clamp for discharging the leading pulse and a trailing pulse ESD protection circuit triggered by the leading pulse clamp for discharging the trailing pulse.

14. In the system of claim 13, wherein the trailing pulse ESD protection circuit includes:
   an event detector for receiving the ESD signal and having a trigger output signal, wherein the event detector provides the trigger output signal in response to receiving the ESD signal;
   a trailing pulse clamp coupled to receive the ESD signal; and
   a switch coupled in series with the trailing pulse clamp, wherein the switch and the trailing pulse clamp provide a trailing discharge path for the trailing pulse, wherein the trigger output signal selectively enables the switch during the trailing pulse.

15. In the system of claim 14, wherein the event detector includes a transistor switch coupled to the ESD input, a voltage input as a reference, and a timing circuit coupled in series between the transistor switch and ground, wherein the transistor switch is enabled by the leading pulse, wherein the timing circuit provides the trigger output signal during the trailing pulse.

16. In the system of claim 15, wherein the timing circuit includes an RC circuit for storing a charge before the trailing pulse, wherein the RC circuit discharges during the trailing pulse to assert the trigger output signal.

17. In the system of claim 14, wherein the trailing pulse ESD protection circuit protects a core circuit of the DUT from the trailing pulse, wherein the core circuit includes at least one input transistor.

* * * * *